(12) United States Patent
Karacaoglu et al.

(10) Patent No.: US 6,684,058 B1
(45) Date of Patent: *Jan. 27, 2004

(54) UNIVERSAL REPEATER FOR COMMUNICATION SYSTEMS

(75) Inventors: Ulun Karacaoglu, San Diego, CA (US); Baya Hatim, San Diego, CA (US); Chi Nche, San Diego, CA (US); Masood K. Tayebi, San Diego, CA (US)

(73) Assignee: Wireless Facilities, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,015

(22) Filed: Jan. 30, 1998

Related U.S. Application Data

(63) Continuation-in-part of application No. 08/905,613, filed on Aug. 4, 1997.

(51) Int. Cl.[7] .............................. H04B 7/14; H04Q 7/20
(52) U.S. Cl. ........................... 455/20; 455/17; 455/466; 455/561
(58) Field of Search .......................... 455/11.1, 14, 15, 455/16, 17, 20, 426, 446, 561, 447, 552, 13.1; 370/315–328

(56) References Cited

U.S. PATENT DOCUMENTS

| 4,006,315 | A | * | 2/1977 | Halstead ...................... 343/79 |
| 4,539,706 | A | * | 9/1985 | Mears et al. ................ 455/11.1 |
| 4,764,979 | A | * | 8/1988 | Noguchi et al. .............. 455/22 |
| 4,882,765 | A | * | 11/1989 | Maxwell et al. ........... 455/11.1 |
| 5,025,452 | A | | 6/1991 | Sohner et al. ................. 375/1 |
| 5,081,703 | A | * | 1/1992 | Lee .............................. 455/20 |
| 5,309,479 | A | | 5/1994 | Cheah ......................... 375/62 |
| 5,377,255 | A | * | 12/1994 | Beasley ....................... 455/17 |
| 5,408,679 | A | * | 4/1995 | Masuda ..................... 455/11.1 |
| 5,603,080 | A | * | 2/1997 | Kallander et al. ............. 455/15 |
| 5,604,789 | A | * | 2/1997 | Lerman ....................... 455/20 |
| 5,697,052 | A | * | 12/1997 | Treatch ....................... 455/15 |
| 5,802,452 | A | * | 9/1998 | Grandfield et al. ........... 455/20 |
| 5,809,398 | A | * | 9/1998 | Moberg et al. ............... 455/17 |
| 5,812,538 | A | * | 9/1998 | Wiedeman et al. ........ 455/12.1 |
| 5,812,933 | A | * | 9/1998 | Niki ............................ 455/16 |
| 5,887,261 | A | * | 3/1999 | Csapo et al. ................ 455/450 |
| 5,890,055 | A | * | 3/1999 | Chu et al. ..................... 455/16 |
| 5,953,637 | A | * | 9/1999 | Coons et al. .............. 455/11.1 |
| 5,956,620 | A | * | 9/1999 | Lazaris-Brunner et al. 455/12.1 |
| 5,970,410 | A | * | 10/1999 | Carney et al. .............. 455/446 |
| 5,987,304 | A | * | 11/1999 | Latt ............................. 455/17 |
| 6,047,177 | A | * | 4/2000 | Wickman .................... 455/422 |
| 6,128,496 | A | | 10/2000 | Scheinert | |
| 6,243,577 | B1 | * | 6/2001 | Elrefaie et al. ............. 455/426 |
| 6,404,775 | B1 | * | 6/2002 | Leslie et al. ................ 370/466 |

* cited by examiner

Primary Examiner—Duc Nguyen
(74) Attorney, Agent, or Firm—Knobbe, Martens, Olson & Bear LLP

(57) ABSTRACT

A system and method for converting carrier frequencies of a wireless communication system is provided. The system and method allow expansion of coverage areas of wireless communication systems, such as a mobile/cellular telephone system. In one embodiment, the system converts RF signals in the PCS band to ISM band, and transmits the ISM signals to a distant repeater station. The repeater station receives the ISM signals and down converts the ISM signals to the PCS band. The PCS signals are retransmitted in a new cell thereby creating a new coverage area. Radio frequency signals are down converted to an Intermediate frequency for channel selectivity and narrow band filtering. Channel selectivity circuitry allows quick reuse of other channels in the same cell. The channel selectivity circuitry includes a SAW filter which significantly reduces out of band interference. The system includes a microcontroller to permit use of programmable synthesized sources for the local oscillators thereby facilitating a variety of communication bands to be utilized in the system.

24 Claims, 10 Drawing Sheets

UNIVERSAL REPEATER FOR COMMUNICATION SYSTEMS

RELATED APPLICATION

This application is a continuation-in-part of U.S. patent application 08/905,613, filed on Aug. 4, 1997, for "Inter-Band Communication Repeater System" by Nche, et al.

BACKGROUND OF THE INVENTION

1. Field of the Invention

The present invention generally relates to voice and data communication systems. More particularly, this invention relates to wireless communication systems including conversion between frequency bands.

2. Description of the Related Art

Over the last decade, the deployment of wireless communication systems around the world has been phenomenal. Wireless communication technology has evolved along a logical path, from simple first-generation analog systems designed for business use to second-generation digital wireless communication systems for business and personal applications.

The first-generation analog systems include the Advanced Mobile Phone System (AMPS). The AMPS system is the widely used system in the United States. It uses cellular analog technology, now defined by the Electronics Industries Associate ("EIA") specification EIA-553. The term "cellular" refers to dividing the service area into many small regions, called cells, each served by a low-power transmitter. Analog systems typically use analog frequency modulation (FM) for speech transmission and frequency shift keying (FSK) for signaling (i.e., control messages). In the United States, the AMPS uses frequency ranges of 824–849 MHz for mobile station transmissions (uplink), and 869–894 MHz for base stations transmissions (downlink). Additionally, a narrowband AMPS (N-AMPS) has also been deployed to increase capacity. N-AMPS divides an analog channel into three parts, thereby tripling the present analog channel capacity.

Outside the United States, there are two main international standards employing digital technology. These standards are the Global System for Mobile Communications (GSM/DCS-1800), and Japanese Digital Cellular (JDC). In the United States, the second generation digital wireless systems conform with the EIA IS-54 or IS-95 digital system standards. The EIA IS-54 standard employs time division multiple access (TDMA), and IS-95 employs code division multiple access (CDMA). Other systems conforming to the IS-136 (employing TDMA) and Personal Communications Services (PCS) standards are also now deployed in the United States.

Systems employing PCS technology operate in the frequency range 1850–1910 MHz for the uplink (i.e., mobile transmit, base receive) and 1930–1990 MHz for the downlink (i.e., base transmit, mobile receive). There are currently two communication standards operating in the PCS bands: a GSM-equivalent standard which employs a combination of TDMA and frequency division multiple access (FDMA), and a spread-spectrum standard employing code division multiple access (CDMA). Using TDMA, the users share the radio spectrum in the time domain. A user is allocated a time slot during which either the whole frequency band (wideband TDMA) or only a part of the band (narrowband TDMA) is accessed. Using FDMA, the users share the radio spectrum in the frequency domain. A user is allocated at least one unique frequency for communication without interference with users in the same frequency spectrum. Using CDMA, a transmitted signal is spread over a band of frequencies much wider than the minimum bandwidth required to transmit the signal.

PCS systems enable users to efficiently transfer any form of information between any desired locations. Basic needs for PCS include standardized low-power technology to provide voice and data to small, economical, pocket-size personal handsets. With other competitive systems already in place, PCS providers are tasked with finding creative ways of providing extensive service to their customers. To provide extensive coverage, however, PCS providers are confronted with a high equipment cost to provide additional cells. Additionally, government-imposed regulations on service providers may increase these costs if new virtual cells are not added within mandated deadlines.

To combat these problems, PCS providers have used repeaters to extend cell coverage area at its edge or fill-in dead spots within the cell. "Dead spots" are areas which have weak reception due to geographic barriers or RF interference. A repeater is a bi-directional radio frequency (RF) amplifier system which receives RF signals from a base transceiver station (BTS) of a donor cell, amplifies the RF signals and re-transmits them to subscribers. A "donor cell" is the cell from which a repeater receives RF signals for further transmission. Conventional repeaters have been designed to operate in fringe areas (i.e., zones just outside the range of a BTS in which RF signals are weak).

One limitation of conventional repeaters is that they can only operate within the neighborhood of the donor cell, where RF coverage is inadequate. In certain situations, coverage may be required tens of miles away from the nearest BTS. To meet this demand, repeaters are cascaded, i.e., placed in geographic sequence, to further extend the coverage area of a BTS. However, cascading conventional repeaters to perform this task can be expensive and time consuming. More importantly, there are technical complications associated with cascading repeaters. One major complication is the associated overall time delay due to sequential repeaters, thereby limiting the maximum number of repeaters that can be cascaded without significant signal degradation.

In view of the foregoing, there is a need in the industry for a new repeater system which extends the coverage area in a wireless communication system without the disadvantages of conventional repeaters. The new repeater system should enable expansion of coverage areas without imposing time-delay or intra-band interference. This repeater system should expand coverage areas while maintaining minimal channel inter-cell interference or congestion. Furthermore, such system should be easy to install and maintain.

SUMMARY OF THE INVENTION

To overcome the above problems, the present invention provides a repeater system which allows the expansion of existing mobile communications coverage areas without the disadvantages of the prior art. The above-mentioned problems are solved by providing an inter-band repeater system which provides conversion of communication from cellular/mobile frequency bands to other frequency bands, such as the Industrial, Scientific and Medical (ISM) frequency bands. The ISM frequency bands allocated by the Federal Communications Commission (FCC) are spread across the frequency ranges of 902–928 MHz, 2400–2484 MHz, and 5725–5850 MHz. The repeater system provides full duplex communications while maintaining proper signaling schemes for a variety of wireless communication systems, such as mobile systems employing CDMA, TDMA, E-TDMA, FDMA, frequency hopping, or similar technologies.

In accordance with one embodiment of the present invention, the repeater system converts PCS signals to ISM frequency bands. The repeater system comprises two main substations: a near-end ISM band transceiver (the "NEIT" station) and a far-end ISM band transceiver (the "FEIT" station). In one direction, called the forward link, the NEIT station receives PCS signals from a BTS of a donor cell, converts the carrier frequencies of the PCS signals to ISM frequencies, and transmits these signals using an antenna over ISM bands. The FEIT station receives these signals, converts the carrier frequencies of these signals to PCS frequencies, and transmits the PCS signals at the desired location. In effect, a new virtual cell is created at the desired location using the FEIT station of the repeater system. The repeater system implements all these steps without affecting signal quality. More importantly, the repeater system processes the PCS signals without interference with the signal modulation and schemes.

The repeater system supports full-duplex communication between a donor cell and a new virtual cell. Hence, the operation of the repeater system in the opposite direction, called the reverse link, is similar to that of the forward link. In one embodiment, the PCS signal is received by the BTS of the donor cell and re-transmitted by that BTS.

One aspect of the invention includes a radio frequency (RF) communication system, comprising a near-end station receiving a signal having at least one original carrier frequency from a wireless communication system, the near-end station including a near-end converter converting the original carrier frequency to at least one first intermediate frequency; a near-end channel selectivity circuit selecting one channel from the signal and converting the first intermediate frequency to at least one second carrier frequency, and a near-end transmitter wirelessly transmitting the selected channel having the second carrier frequency; and a far-end station including a far-end receiver wirelessly receiving the selected channel having the second carrier frequency from the near-end transmitter and converting the second carrier frequency to a second intermediate frequency, a far-end channel selectivity circuit selectively filtering the received channel and converting the second intermediate frequency to the original carrier frequency, and a far-end transmitter transmitting the received channel having the original carrier frequency.

Another aspect of the invention includes a radio frequency (RF) communication system, comprising a near-end station receiving a signal having at least one original carrier frequency from a wireless communication system, the near-end station including a near-end converter converting the original carrier frequency to at least one first intermediate frequency, a near-end filtering circuit capable of narrow band filtering the signal having the first intermediate frequency and converting the first intermediate frequency to at least one second carrier frequency, and a near-end transmitter transmitting the signal having the second carrier frequency; and a far-end station including a far-end receiver receiving the signal having the second carrier frequency from the near-end transmitter and converting the second carrier frequency to a second intermediate frequency, a far-end filtering circuit capable of narrow band filtering the signal having the second intermediate frequency and converting the second intermediate frequency to the original carrier frequency, and a far-end transmitter transmitting the signal having the original carrier frequency.

Another aspect of the invention includes a radio frequency (RF) communication system, comprising a far-end station receiving a signal having at least one original carrier frequency, the far-end station including a far-end converter converting the original carrier frequency to at least one first intermediate frequency, a far-end channel selectivity circuit selecting one channel from the signal and converting the first intermediate frequency to a different second carrier frequency, and a far-end transmitter transmitting the selected channel having the different second carrier frequency; and a near-end station including a near-end receiver receiving the selected channel having the different second carrier frequency from the far-end transmitter, a near-end converter converting the different second carrier frequency to a second intermediate frequency, and a near-end channel selectivity circuit selectively filtering the received channel and converting the second intermediate frequency to the original carrier frequency.

Another aspect of the invention includes a system having a first communication station, the first communication station receiving a signal having at least one original carrier frequency from a cellular communication system, the system comprising a converter converting the original carrier frequency to at least one first intermediate frequency; a channel selectivity circuit selecting one channel from the signal and converting the first intermediate frequency to at least one second carrier frequency; and a transmitter transmitting the selected channel having the second carrier frequency.

A further aspect of the invention includes a method of communicating a radio frequency (RF) signal, the method comprising the steps of receiving a signal having at least one original carrier frequency from a wireless communication system; converting the original carrier frequency to at least one first intermediate frequency; selecting one channel from the signal; converting the first intermediate frequency to at least one second carrier frequency; wirelessly transmitting the selected channel having the second carrier frequency; wirelessly receiving the selected channel having the second carrier frequency; converting the second carrier frequency to a second intermediate frequency; filtering the received channel; converting the second intermediate frequency to the original carrier frequency; and communicating the received channel having the original carrier frequency to a distant station.

Yet another aspect of the invention includes a method of converting carrier frequencies of a radio frequency (RF) signal, the method comprising the steps of receiving a signal having at least one original carrier frequency; converting the original carrier frequency to at least one first intermediate frequency; selecting one channel from the signal; converting the first intermediate frequency to at least one second carrier frequency; wirelessly transmitting the selected channel having the second carrier frequency; wirelessly receiving the selected channel having the second carrier frequency; converting the second carrier frequency to a second intermediate frequency; filtering the received selected channel; converting the second intermediate frequency to the original carrier frequency; and communicating the received selected channel having the original carrier frequency to a wireless communication system.

A final aspect of the invention includes a method of communicating a radio frequency (RF) signal, the method comprising the steps of receiving a signal having at least one original carrier frequency from a wireless communication system; converting the original carrier frequency to at least one first intermediate frequency; narrow band filtering the signal having the first intermediate frequency; converting the first intermediate frequency to at least one second carrier frequency; transmitting the signal having the second carrier frequency; receiving the signal having the second carrier frequency; converting the second carrier frequency to a second intermediate frequency; narrow band filtering the signal having the second intermediate frequency; converting the second intermediate frequency to the original carrier frequency; and communicating the signal having the original carrier frequency to a distant station.

BRIEF DESCRIPTION OF THE DRAWINGS

The above and other aspects, features and advantages of the present invention will be better understood by referring to the following detailed description of the preferred embodiments, which should be read in conjunction with the accompanying drawings, in which.

DETAILED DESCRIPTION OF THE PREFERRED EMBODIMENTS

The present invention provides an inter-band repeater system for expanding and creating new coverage areas in wireless communication systems. The repeater system comprises two main stations: a near-end transceiver station and a far-end transceiver station. The near-end transceiver station receives RF signals from an existing donor base transceiver station (BTS) operating in an original frequency band. The near-end transceiver station converts the RF signals to another frequency band for transmission to the far-end transceiver station. Upon receiving the signals, the far-end transceiver station converts the signals to the original frequency band, or to another desired frequency band, for retransmission in a new coverage area.

A detailed description of a PCS-ISM repeater system is provided below. As one embodiment of the present invention, it is not intended to limit the enumerated claims, but to serve as a particular example thereof.

Figure 1:
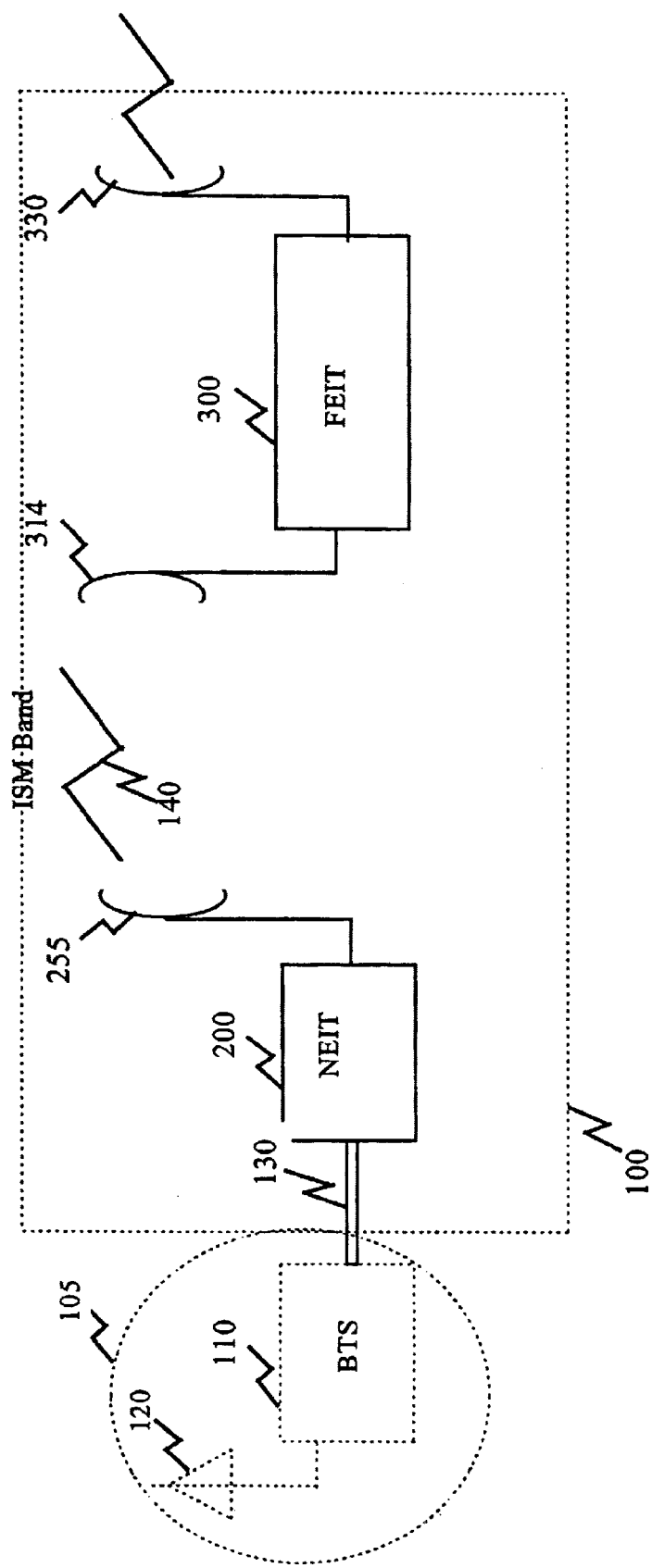
FIG. 1 is a functional block diagram depicting one embodiment of the inter-band repeater system using ISM bands.

FIG. 1 is a functional block diagram of one embodiment of the inter-band repeater system 100. The repeater system 100 supports full-duplex voice and/or data communications using a forward link (from a donor cell to a new "virtual" cell) and reverse link (from the new cell to the donor cell) simultaneously. In doing so, conventional modulation/demodulation techniques and signal schemes, such as spread spectrum CDMA, are not changed. In one embodiment, a BTS 110 is a PCS CDMA base station. Therefore, the signal schemes for ISM signals and PCS signals are the same.

In one embodiment, the BTS 110 supports full-duplex voice and/or data communications using an omni-directional, or two or more directional, antenna(s) 120 over a coverage area 105 (the "donor cell"). In the PCS band, the BTS 110 operates in the 1850–1910 frequency range for uplink (mobile transmit, BTS receive) communications, and in the 1930–1990 MHz frequency range for the downlink (BTS transmit, mobile receive) communications. More particularly, the carrier frequency for PCS CDMA signals is centered at 1880 MHz (with a total bandwidth of 60 MHz) for the uplink, and 1960 MHz (with a total bandwidth of 60 MHz) for the downlink.

In one embodiment, the system 100 comprises a near-end ISM transceiver ("NEIT") station 200 and a far-end ISM transceiver ("FEIT") station 300. On the forward link, the NEIT station 200 receives RF signals from the BTS 110 of the donor cell 105 via a cable 130. The cable 130 is a conventional non-radiating coaxial cable, whereby RF signals are transmitted with a low loss of signal strength. The cable 130 delivers to the NEIT station 200 RF signals in the PCS band (1930–1990 MHz for the forward link). In one embodiment, these PCS signals have signal power between −30 and 0 dBm. In case of weaker signals, a linear power amplifier (not shown) may be used at the NEIT 200 to amplify PCS signals. The NEIT station up-converts the carrier frequencies of the PCS signals from the 1850–1910 MHz band to one of the ISM bands, such as the 2400–2484 MHz band. After up-converting the PCS signals, the ISM signals are transmitted to the FEIT station 300 over an ISM link 140 preferably using a directional antenna 255. Although other kinds of antennas may be used, a high gain directional antenna may provide ISM transmission distances ranging up to 30 miles, depending on RF propagation conditions.

At the FEIT station 300, the ISM signals are down-converted from the ISM band to the PCS band (1930–1990 MHz) for retransmission. Then, the FEIT station 300 retransmits the PCS signals over a new virtual cell 410 (FIG. 4) to PCS band users. In effect, the coverage area of the donor cell 105 is expanded, or a new BTS station is created, tens of miles away with minimal delay or inter-PCS band interference. For the reverse link, steps similar to those discussed above are repeated in a reverse order.

Figure 2:
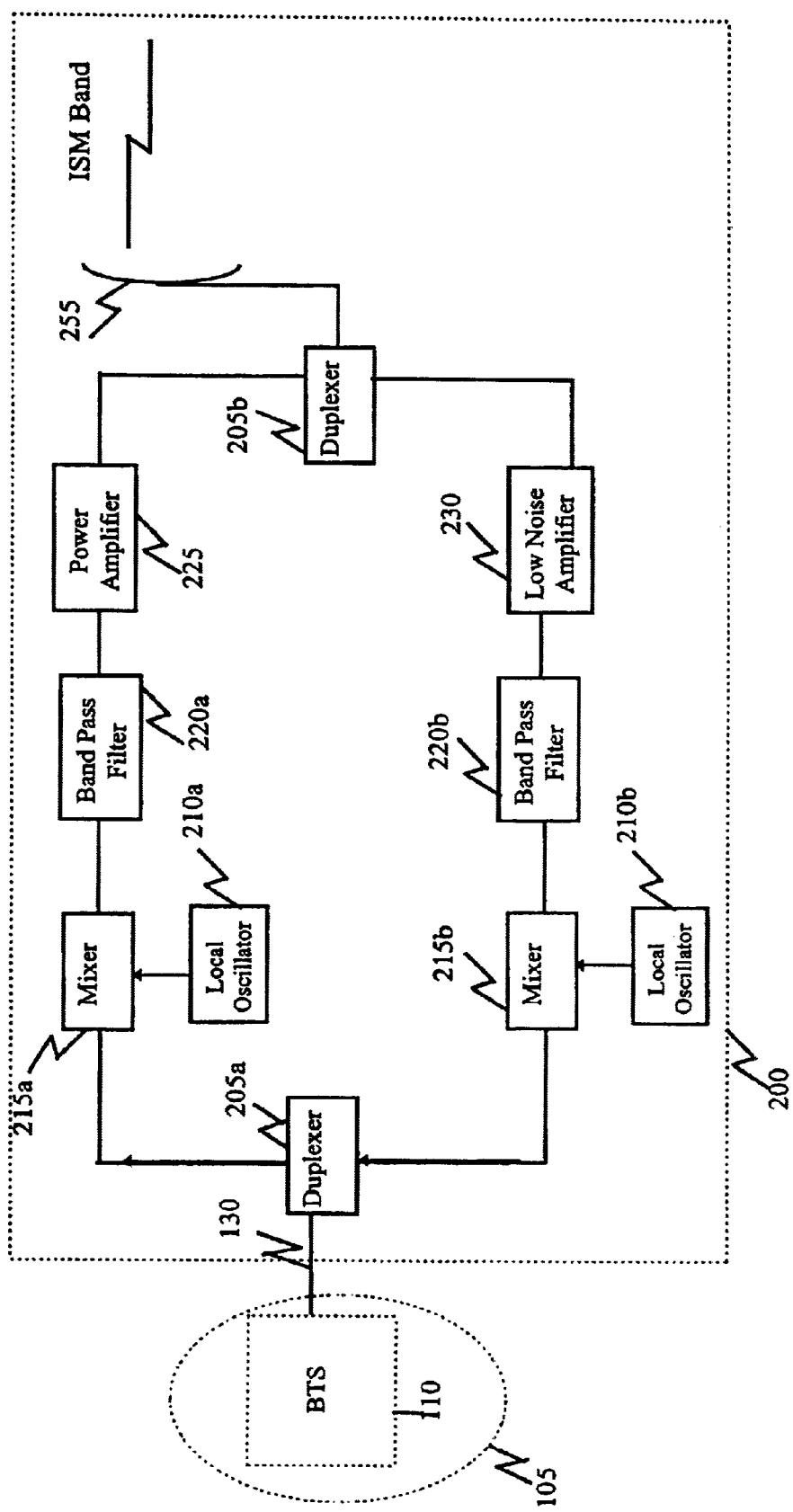
FIG. 2 is a functional block diagram of a first embodiment of a near-end ISM transceiver (NEIT) station used in FIG. 1.

Referring now to FIG. 2, a functional block diagram of the near-end ISM transceiver (NEIT) station 200 used in the embodiment of FIG. 1 is shown. The NEIT station 200 receives RF signals from the BTS 110 of a donor cell 105 (FIG. 1) via the cable 130. The NEIT station 200 up-converts the RF signals to an ISM band and radiates these signals using a high gain directional antenna 255. In the forward link direction, the NEIT station 200 receives PCS signals through a first duplexer 205a connected to the BTS 110 (FIG. 1) via a cable 130. A mixer 215a is connected to the duplexer 205a to receive the PCS signals therefrom. A local oscillator 210a is connected to the mixer 215a for performing signal conversion. A band pass filter 220a is connected to the mixer 215a for filtering the processed signals. A power amplifier 225 is connected to the band pass filter 220a to amplify the signals. A second duplexer 205b is connected to the power amplifier 225 to filter the signals. The second duplexer 205b feeds the signals into a high gain directional antenna 255 for transmission.

In the reverse link direction, the duplexer 205b receives incoming ISM signals from the antenna 255. A low noise amplifier 230 is connected to receive the signals from the duplexer 205b for amplification. The low noise amplifier 230 feeds the signals to a band pass filter 220b for filtering the signals. A mixer 215b is connected to the band pass filter 220b to receive the signals for conversion. A local oscillator 210b is connected to the mixer 215b to perform signal conversion. The duplexer 205a is connected to the mixer 215b for filtering out the signals. Finally, the duplexer 205a feeds the signals to the BTS 110 via the cable 130 for retransmission.

As shown in FIG. 2, for the forward link, RF signals are fed directly into the duplexer 205a from the BTS 110 via the cable 130. RF signals may also be received without the duplexer 205a when obtained after the duplexing stage in the BTS 110, as would be understood by one skilled in the pertinent technology. The duplexer 205a filters out and attenuates noise of the RF signals. The filtered RF signals are fed into the mixer 215a where they are up-converted using the local oscillator 210a. In one embodiment, the mixer 215a has frequency ranges of 0.3 to 5 GHz (for RF-LO port) and 0.1 to 3 GHz (for IF port). In one embodiment, the mixer 215a is model number MD-154 manufactured by MACOM, and the local oscillator 210a has a frequency step size of 1.25 MHz and an operating band of 450–600 MHz. In one embodiment, the local oscillator 210a is model number V550 ML01 manufactured by ZCOM. The mixer 215a and local oscillator 210a enable the up-conversion of PCS signals from 1850–1990 MHz to 2400–2484 MHz. The combination of the mixer 215a and the local oscillator 210a often generates undesired images (e.g., low-frequency noise). At this stage, the ISM signals are fed into a band pass filter 220a to eliminate any undesired images. The band-filtered signals are then fed into a power amplifier 225 for transmission. In one embodiment, the power amplifier 325 has a gain of around 27 dB, a flatness of ±0.3 dB, and a maximum output power of 25 Watts. The power amplifier 225 amplifies the ISM signals for transmission via the high gain directional antenna 255. In one embodiment, the antenna 255 has a gain of around 24 dBi and a beamwidth of around 10 degrees. To minimize intra-signal interference, the ISM signals are first connected to a duplexer 205b for restricting out-of-band radiations.

For the reverse link, steps similar to those discussed above are repeated in a reverse order. The antenna 255 receives ISM signals from the FEIT 300 and feeds these signals into the duplexer 205b. The duplexer 205b filters out any undesired images. The ISM signals are then fed into the low noise amplifier 230 to strengthen the signal power for conversion. Prior to conversion, however, the band pass filter 220b filters out any noise generated due to amplification. The mixer 215b and local oscillator 210b are then used to down-converts the ISM signals to the PCS band (1850–1910 MHz). In one embodiment, the same mixer and oscillator are used as specified for mixer 215a and local oscillator 210a. Finally, the duplexer 205a filters out any undesired images after conversion. The PCS signals are then fed into the BTS 110 via the cable 130. The NEIT station 200 is not necessarily restricted to the above delineated equipment characteristics. Other equipment having similar functionality but different characteristics may also be used.

Figure 3:
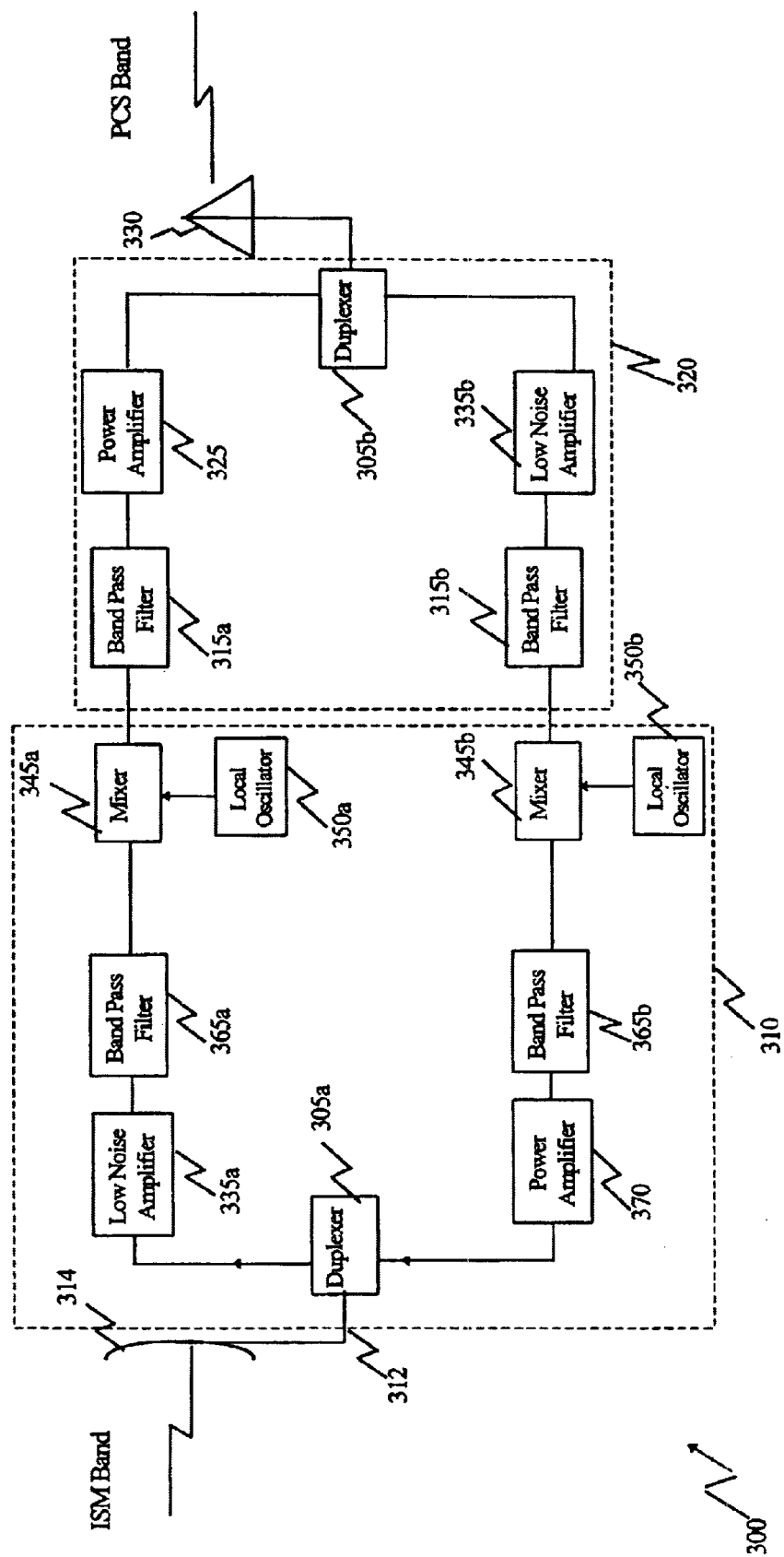
FIG. 3 is a functional block diagram of a first embodiment of a far-end ISM transceiver (FEIT) station used in FIG. 1.
Figure 4:
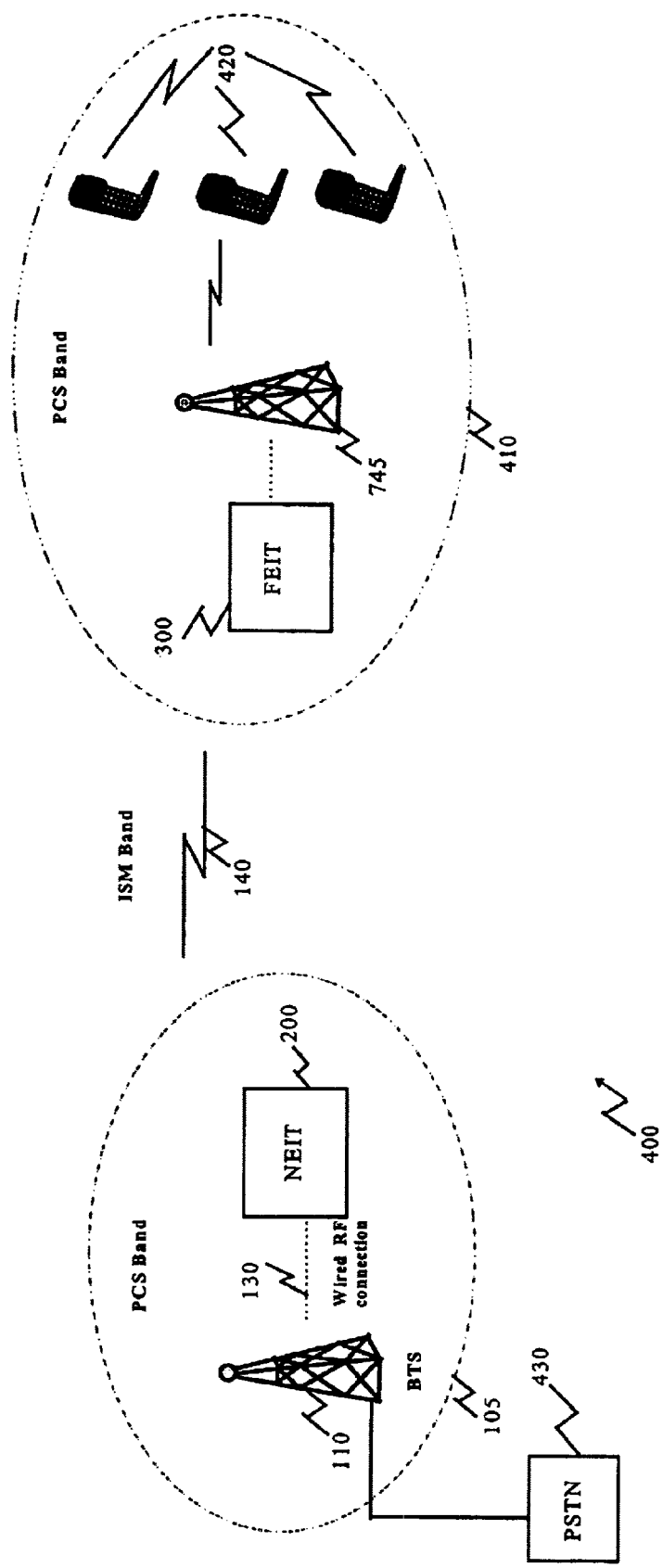
FIG. 4 is a pictorial representation of cell expansion in a mobile telephone system using the inter-band repeater system of the present invention.

Now referring to FIG. 3, a functional block diagram of a far-end ISM transceiver (FEIT) station 300 with the repeater system used in FIG. 1 is shown. The FEIT station 300 receives ISM signals from the NEIT station 200. The FEIT station down-converts the ISM signals to the PCS bands and re-radiates them to other PCS users thereby creating a new virtual cell 410 (FIG. 4). The FEIT station 300 receives ISM signals via an ISM band antenna 314, a far-end transceiver 310 transmitting and receiving signals through the ISM antenna 312, a PCS repeater 320 connected to the far-end transceiver 310, and a PCS band antenna 330 connected to the PCS repeater 320.

In the forward link direction, the far-end transceiver 310 receives ISM signals from the ISM band antenna 314 through a first duplexer 305a. The duplexer 305a is connected to the ISM band antenna 314 via a cable 312. A low noise amplifier 335a is connected to the duplexer 305a for amplifying the ISM signals. The low noise amplifier connects to a band pass filters 365a for filtering the signals. A mixer 345a is connected to the band pass filter 365a for signal conversion. The mixer 345a is connected to a local oscillator 350a to perform the signal conversion. The mixer 345a is connected to a band pass filter 315a of the PCS repeater 320. A power amplifier 325 is connected to the band pass filter 315a for amplifying the signals. A second duplexer 305b is connected to the power amplifier 325 for filtering the signals before transmission through a PCS antenna 330.

In the reverse link direction, the FEIT station 300 receives PCS signals from the antenna 330 through the duplexer 305b. The duplexer 305b feeds the signals into a low noise amplifier 335b for amplification. A band pass filter 315b is connected to the low noise amplifier 335b to filter the signals. The band pass filter 315b is connected to the a mixer 345b of the far-end transceiver 310. The mixer 345b is connected to a local oscillator 350b to perform signal conversion. A band pass filter 365b receives the signals from the mixer 345b for filtering the signals. The band pass filter 365b feeds the signals to a power amplifier 370 for amplification. The duplexer 305a receives the signals from the power amplifier 370 for transmission through the antenna 314.

As shown in FIG. 3, for the forward link, the ISM band antenna 314 receives the ISM signals from the NEIT station 200. In one embodiment, the antenna 314 has a gain of around 24 dBi and a beamwidth of around 10°. The ISM signals are fed directly into the duplexer 305a from the antenna 314 via a cable 312. The duplexer 305a filters out and attenuates spurious component of the ISM signals. The filtered ISM signals are fed into the low noise amplifier 335a to amplify the ISM signals in view of their weak strength upon reception. A band pass filter 365a is then used to filter out of band signals from the ISM signals. The characteristics of the band pass filter 365a are similar to those of the filter 220a (shown in FIG. 2). The filtered ISM signals are then fed into the mixer 365a where they are down-converted to the PCS band (1930–1990 MHz) using the local oscillator 350a. The characteristics of the mixer 345a and local oscillator 350a are similar to those of the mixer 215a and local oscillator 210a, respectively, of the NEIT station 200 (FIG. 2). As noted above, the combination of the mixer 345a and the local oscillator 350a often generates undesired images. Therefore, at the PCS repeater 320, the (now PCS) signals are fed into a band pass filter 315a to eliminate any undesired images. The band-filtered PCS signals are then fed into a power amplifier 325 for transmission. In one embodiment, the power amplifier 325 has a gain of around 27 dB, a flatness of ±0.3 dB, and a maximum output power of 25 Watts. The power amplifier 325 amplifies the PCS signals for transmission via the antenna 330. To minimize intra-signal interference, the PCS signals are first passed through a duplexer 305b to restrict out of band radiations. The PCS repeater 320 supports full-duplex voice and/or data communications using an omni-directional, or at least two directional, antenna(s) 330 over the new virtual cell 410 (FIG. 4).

For the reverse link, steps similar to those discussed above are repeated in a reverse order. The antenna 330 receives PCS signals in the uplink range (1850–1910 MHz) from multiple distant stations, such as Mobile Stations (MS) 420 (FIG. 4). The PCS signals are fed into the duplexer 305b to filter out noise. The low noise amplifier 335b is used to amplify the signal power of the received PCS signals. The band pass filter 315b is used to filter out any undesired images generated by the amplification stage. From the band pass filter 315b, the PCS signals are fed into the mixer 345b which, in conjunction with the local oscillator 350b, up-converts the PCS signals to the ISM band. The band pass filter 365b is then used to filter any noise generated by the conversion stage. The power amplifier 370 amplifies the ISM signals for transmission. Finally, the duplexer 305a is used to filter out any noise generated by amplification. The ISM signals are fed into the ISM band antenna 314 via the cable 312 for transmission to the NEIT station 200. The FEIT station 300 is not necessarily restricted to the above delineated equipment characteristics. Other equipment having similar functionality but different characteristics may also be used.

FIG. 4 is a pictorial representation of cell expansion in a mobile telephone system using the inter-band repeater system of the present invention. In one embodiment, as shown in FIG. 4, a donor cell 105 comprises a base transceiver station (BTS) 110 operating in the PCS band. The BTS 110 of the donor cell is connected to a public switched telephone network (PSTN) 430 for communication to the rest of the world. In this embodiment, the NEIT station 200 (FIG. 2) converts PCS signals to ISM signals and, then, transmits them over the ISM link 140. At the new virtual cell 410, the FEIT station 300 (FIG. 3) converts the ISM signals to PCS signals and transmits them over the new virtual cell 410 to distant stations 420, such as mobile stations (MS). Using the repeater system 100 (FIG. 1), the coverage area of the PCS donor cell 105 is in effect expanded by creating the new virtual cell 410 without the expense of provisioning a new PCS station. The reduction in expense is mainly due to the ability of the repeater system 100 to transparently transfer all signal intelligence and schemes from the donor cell 105 to the new virtual cell 410. In doing so, the repeater system 100 minimizes, and perhaps eliminates, the need for any intelligent hardware or software at the new virtual cell 410.

Again referring to FIG. 1, in a second embodiment, the system 100 comprises a near-end ISM transceiver ("NEIT") station 200 and a far-end ISM transceiver ("FEIT") station 300. On the forward link, the NEIT station 200 receives RF signals from the BTS 110 of the donor cell 105 via either a cable 130 or an antenna 130'. The cable 130 is a conventional non-radiating coaxial cable, whereby RF signals are transmitted with a low loss of signal strength. A directional antenna is used if the antenna 130' is used to communicate with the BTS 110. Either the cable 130 or the antenna 130' deliver to the NEIT station 200 RF signals in the PCS band (1850–1910 MHz for the forward link) or other bands such as the cellular band (800–849 MHz in the forward link). In one embodiment, the PCS signals have a minimal power of −30 dBm. In case of weaker signals, a linear power amplifier (not shown) may be used at the NEIT 200 to amplify PCS signals. The NEIT station up-converts the carrier frequencies of the PCS signals from the 1850–1910 MHz band to one of the ISM bands, such as the 2400–2484 MHz band. After up-converting the PCS signals, the ISM signals are transmitted to the FEIT station 300 over an ISM link 140 preferably using a directional antenna 255. Although other kinds of antennas may be used, a high gain directional antenna may provide ISM transmission distances ranging up to 30 miles, depending on RF propagation conditions.

At the FEIT station 300, the ISM signals are down-converted from the ISM band to the PCS band (1930–1990 MHz) or other bands such as cellular (869–894 MHz) for retransmission. Then, the FEIT station 300 retransmits the down-converted signals such as PCS signals over a new cell 410 (FIG. 4) to PCS band users. In effect, the coverage area of the donor cell 105 is expanded, or a new "virtual" BTS station is created, tens of miles away with minimal delay or inter-PCS band interference. For the reverse link, a procedure similar to that discussed above is repeated in reverse order.

Figure 5:
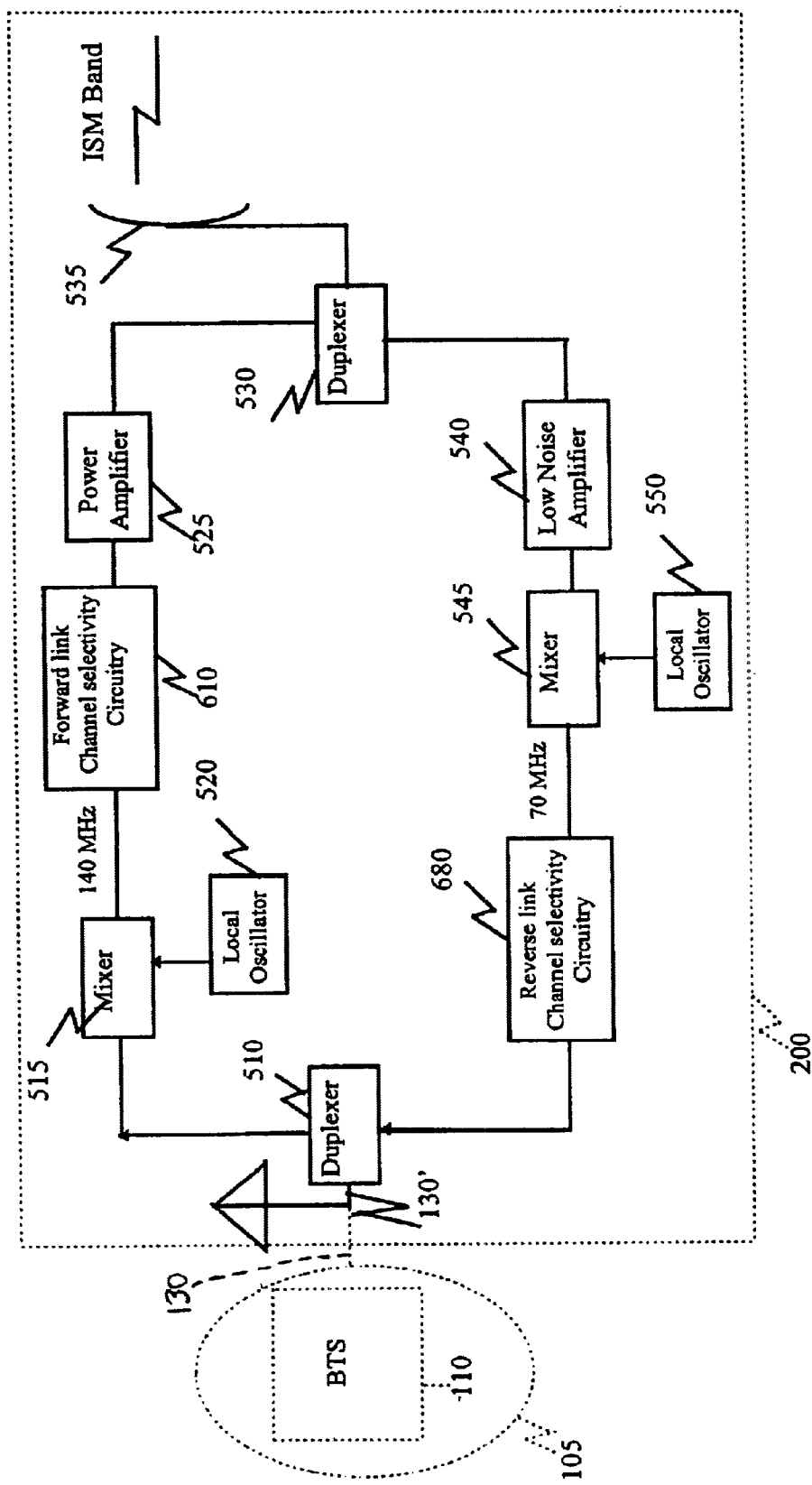
FIG. 5 is a functional block diagram of a second embodiment of the near-end ISM transceiver (NEIT) station used in FIG. 1.

Referring now to FIG. 5, a functional block diagram of the near-end ISM transceiver (NEIT) station 200 used in the second embodiment of FIG. 1 will be described. The NEIT station 200 receives RF signals from the BTS 110 of a donor cell 105 (FIG. 1) via either the cable 130 or the directional antenna 130'. The NEIT station 200 up-converts the RF signals to an ISM band and radiates these signals using a high gain directional antenna 535. In this embodiment, the NEIT station 200 comprises a first duplexer 510 connected to the BTS 110 (FIG. 1), two mixers 515 (for the forward link) and 545 (for the reverse link), two local oscillators 520 (for the forward link) and 550 (for the reverse link) connected to the mixers 515 and 545 respectively, two channel selectivity circuits 610 (for the forward link) and 680 (for the reverse link), a power amplifier 525 for the forward link, a low noise amplifier 540 for the reverse link, a second duplexer 530 connected to the power amplifier 525 and low noise amplifier 540 simultaneously, and a high gain directional antenna 535 connected to the duplexer 530.

As shown in FIG. 5, for the forward link, RF signals are fed directly into the duplexer 510 from the BTS 110 via the cable 130 or antenna 130'. RF signals may also be received without the duplexer 510 when obtained after the duplexing stage in the BTS 110, as understood by one skilled in the pertinent technology. The duplexer 510 filters out and attenuates noise of the RF signals. The filtered RF signals are fed into the mixer 515 where they are down-converted using the local oscillator 520. In one embodiment, the mixer 515 has frequency ranges of 0.3 to 5 GHz (for the RF-Local Oscillator port) and 0.1 to 3 GHz (for the IF output port), while the local oscillator (synthesized source) 520 has a frequency step size of either 1.25 MHz or 0.625 MHz and an operating band of 1.7–2.5 GHz. The mixer 515 and local oscillator (synthesized source) 520 enable the down-conversion of PCS signals (or any other RF signals such as cellular, PCS, such as commercially employed by Sprint, and similar signals) from 1850–1990 MHz to the Intermediate Frequency (IF) 140 MHz. The combination of the mixer 515 and the local oscillator 520 often generates undesired frequencies. At this stage, the resulting signals are fed into a forward link channel selectivity circuitry 610 (FIG. 6) to eliminate any undesired frequencies. The resulting signal from the channel selectivity circuitry 610 is then fed into the power amplifier 525 for transmission. With a gain of around 27 dB or better, the power amplifier 525 amplifies the ISM signals for transmission via the high gain directional antenna 535. In one embodiment, the antenna 535 has a gain of around 24 dBi and a beamwidth of around 10 degrees. To minimize intra-signal interference, the ISM signals are first connected to a duplexer 530 for restricting out-of-band radiations.

For the reverse link, except for minor variations, processing similar to that discussed above is repeated in reverse order. Instead of a power amplifier 525, however, a low noise amplifier 540 is used to amplify the ISM signals in view of their weak strength upon reception by the antenna 535. The resulting signals are then fed into the mixer 545 combined with the local oscillator 550 for down-conversion to the Intermediate Frequency (IF) 70 MHz. These signals are then fed into the reverse link channel selectivity 680 (FIG. 6) for further processing. The NEIT station 200 is not necessarily restricted to the above delineated equipment characteristics. Equipment having similar functionality but different characteristics may also be used.

Now referring to FIG. 6, a functional block diagram of the channel selectivity circuitry 610 and 680 within the NEIT station 200 shown in FIG. 5 will be described. The channel selectivity circuitry 600 comprises a forward link channel selectivity circuit 610 and a reverse link channel selectivity circuit 680. The forward link channel selectivity circuitry 610 comprises a low pass filter 605, three amplifiers 615, 625 and 635, a variable attenuator 620, a Surface Acoustic Wave (SAW) filter 630, a mixer 640, and a local oscillator (synthesized source) 645 connected to the mixer 640. The reverse link channel selectivity circuitry 680 comprises similar components to those of the forward link channel selectivity 610 except for minor variations. The channel selectivity circuitry allows channel re-usability and simpler narrow-band filtering than using RF filtering. Furthermore, the combination of the elements within the channel selectivity circuit gives a cleaner out of band response.

In a conventional PCS system, a 60 MHz band centered at 1880 MHz is used in the uplink direction and a 60 MHz band centered at 1960 MHz is used in the downlink direction. In one embodiment, a channel bandwidth of 2.5 MHz provides around 15 PCS channels for transmitting voice, data or control signals, of which all channels are used in the repeater. In another embodiment, the channel selectivity circuit down-converts the PCS signals to an IF frequency (e.g., at 140 MHz or 70 MHz) where a particular channel is selected to send the information, e.g., voice. This channel would be available for a distant station such as a mobile phone user. The other PCS channels are thereby free to be used for other purposes, such as for data, which is considered to be the channel reusability feature. A further embodiment utilizes a plurality of channel selectivity circuits, e.g., eleven circuits. Thus, there may be a number of circuits 610 receivably connected to the mixer 515 and a number of circuits 680 receivably connected to the mixer 545.

Down-conversion to an IF frequency and use of a SAW filter in the channel selectivity circuit also has the benefit of providing a cleaner out of band response. Use of a standard filter, such as a band pass-filter, is not sufficient to remove all the noise and spurious signals generated by the combination of the mixer and the local oscillator (LO). A SAW filter has a brick wall response characteristic and filters over a narrower bandwidth. When the IF signal is subsequently upconverted back to a RF frequency, the signal is well filtered and most, if not all, of the noise and spurious signals are rejected. Within the RF section, the "cleaner" signal is fed into a simpler and cheaper band pass filter than if the channel selectivity circuit is not utilized.

Figure 6:
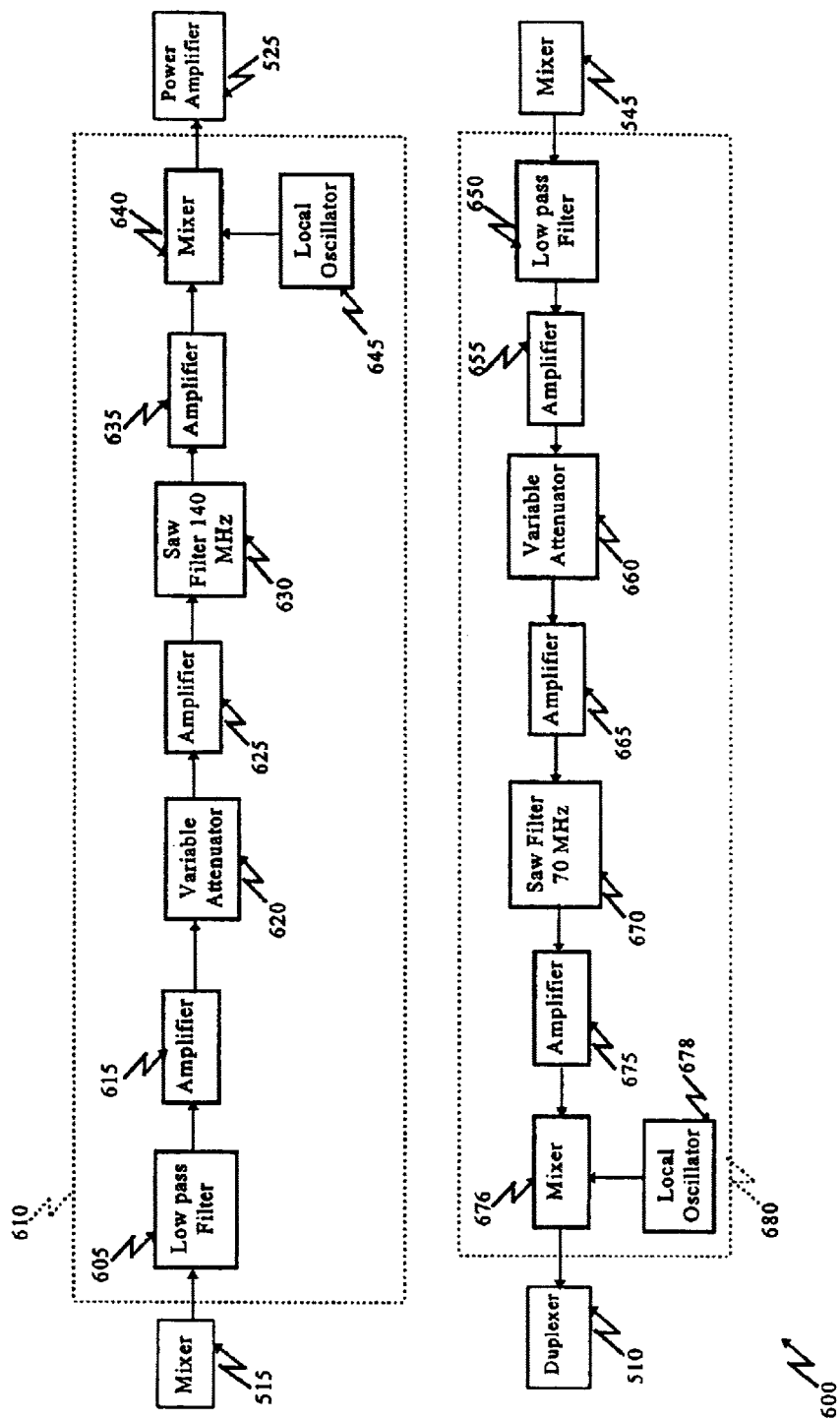
FIG. 6 is a functional block diagram of the Channel Selectivity circuit shown in FIG. 5.

As shown in FIG. 6, for the forward link, IF signals (140 MHz) are fed directly into a low pass filter 605 from the mixer 515. The low pass filter 605 filters the IF signals from the undesired frequencies generated by the combination of the mixer 515 and the local oscillator 520. The low pass filtered signals are fed into the amplifier 615 for noise figure, i.e., power to noise ratio, improvement and then to the variable attenuator 620. The variable attenuator 620 is used for manual gain control during the system set-up. The IF signals are further amplified through the amplifier 625 and then fed directly to the SAW filter 630. In one embodiment, the SAW filter 630 has a center frequency of 140 MHz and a better shape factor as well as a higher rejection of spurious signals and noise than other filter types. The SAW filtered signals are then fed to the amplifier 635 for further noise figure improvement. The resulting signals are then fed into the mixer 640 combined with the local oscillator 645 for up-conversion to the ISM frequencies (2400–2448 MHz) or any other frequencies. The ISM signals are then fed into the power amplifier 525 for transmission via the high gain directional antenna 535.

For the reverse link, except for minor variations, processing similar to that discussed above is repeated in a reverse order. The IF signals (70 MHz) are fed into the low pass filter 650 from the mixer 545. The low pass filtered signals are then amplified 655 to improve noise figure, fed into the variable attenuator 660, additionally amplified by amplifier 665 and then fed into the SAW filter 670. In one embodiment, the SAW filter 670 has a center frequency of 70 MHz. After further amplification of the IF signals by an amplifier 675, the signals are fed into the mixer 676, which combined with the local oscillator 678, up-convert the IF signals at 70 MHz into the PCS frequency (or any other frequency). The channel selectivity circuitry 600 is not necessarily restricted to the above delineated equipment characteristics. Equipment having similar functionality but different characteristics may also be used.

Figure 7:
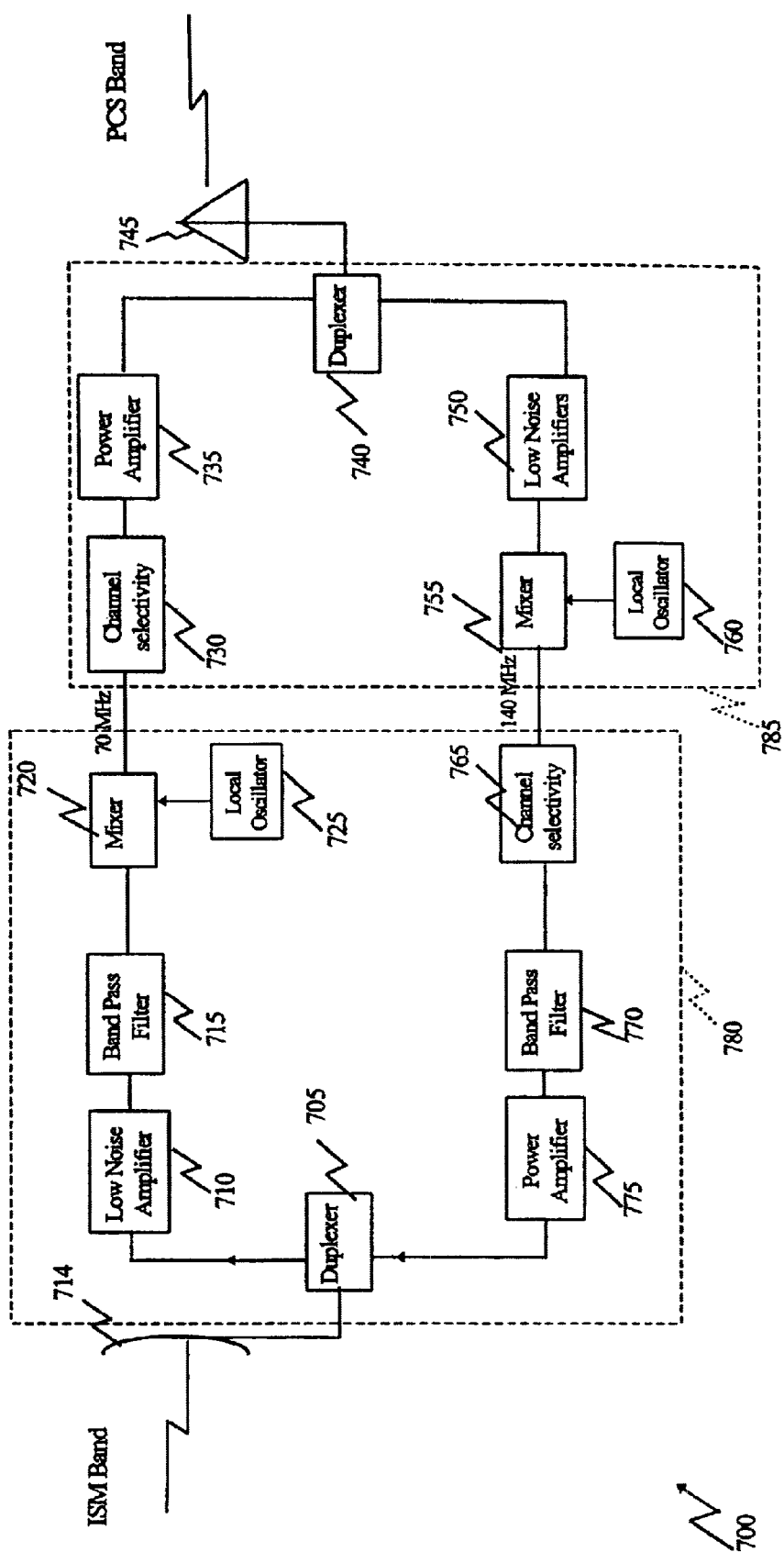
FIG. 7 is a functional block diagram of a second embodiment of the far-end ISM transceiver (FEIT) station used in FIG. 1.

Referring to FIG. 7, a functional block diagram of the second embodiment of a far-end ISM transceiver (FEIT) station 700 with the repeater system 100 used in FIG. 1 will be described. The FEIT station 700 receives ISM signals from the NEIT station 200. The FEIT station down-converts the ISM signals to the PCS bands (or other bands) and re-radiates them to other PCS users thereby creating a new "virtual" cell 410 (FIG. 4). The FEIT station 700 comprises an ISM band antenna 714, a far-end transceiver 780 transmitting and receiving signals through the ISM antenna 714, a PCS repeater 785 connected to the far-end transceiver 780, and a PCS band antenna 745 connected to the PCS repeater 785. The far-end transceiver 780 comprises a duplexer 705 connected to the ISM band antenna 714, a low noise amplifier 710 connected to the duplexer 705, a power amplifier 775 connected to the duplexer 705, two band pass filters 715 (for the forward link) and 770 (for the reverse link) connected to the low noise amplifier 710 and power amplifier 775 respectively, a mixer 720 (for the forward link) connected to the band pass filter 715, a local oscillator 725 (for the forward link) connected to the mixer 720, and in the reverse link, a channel selectivity circuitry 765 connected to the band pass filter 770. The PCS repeater 785 comprises a channel selectivity circuitry 730 in the forward link connected to the far-end transceiver 780, a power amplifier 735 (in the forward link) connected to the channel selectivity circuitry 730, one or more low noise amplifiers 750 (in the reverse link), a duplexer 740 connected to both the power amplifier 735 and the low noise amplifiers 750 simultaneously, a mixer 755 connected to the low noise amplifiers 750 and to the channel selectivity circuit 765 within the far-end transceiver 780, a local oscillator 760 connected to the mixer 755 and a PCS antenna 745 connected to the duplexer 740.

As shown in FIG. 7, for the forward link, the ISM band antenna 714 receives the ISM signals from the NEIT station 200. In one embodiment, the antenna 714 has a gain of around 24 dBi and a beamwidth of around 10 degrees. The ISM signals are fed directly into the duplexer 705 from the antenna 714. The duplexer 705 filters out and attenuates spurious component of the ISM signals. The filtered ISM signals are fed into the low noise amplifier 710 to amplify the ISM signals in view of their weak strength upon reception. A band pass filter 715 is then used to filter out of band signals from the ISM signals. The filtered ISM signals are then fed into the mixer 720 where they are down-converted to the IF frequency (70 MHz) using the local oscillator (synthesized source) 725. The characteristics of the mixer 720 and local oscillator 725 are similar to those of the mixer 515 and local oscillator 520, respectively, of the NEIT station 200 (FIG. 5). As noted above, the combination of the mixer 720 and the local oscillator 725 often generates undesired frequencies. Therefore, at the PCS repeater 785, the signals (e.g., PCS, cellular, or similar signals) are fed into a channel selectivity circuitry 730 to eliminate any undesired frequencies, improve system noise figure, eliminate out of band interference and carry out narrow-band filtering. The resulting PCS signals are then fed into a power amplifier 735 for transmission. In one embodiment, the power amplifier 735 has a gain of around 27 dB, a flatness of ±0.3 dB, and a maximum output power of 40 Watts. The power amplifier 735 amplifies the PCS signals for transmission via the antenna 745. To minimize intra-signal interference, the PCS signals are first passed through a duplexer 740 to restrict out of band radiations. The PCS repeater 785 supports full-duplex voice and/or data communications using an omni-directional, or at least two directional, antenna(s) 745 over the new cell 410 (FIG. 4).

For the reverse link, except for minor variations, processing similar to that discussed above is repeated in reverse order. Instead of the power amplifier 735, however, one or more low noise amplifiers 750 is used to amplify the PCS signals in view of their weak strength upon reception by the antenna 745. The FEIT station 700 is not necessarily restricted to the above delineated equipment characteristics. Other equipment having similar functionality but different characteristics may also be used.

Now referring to FIG. 8, a functional block diagram of the channel selectivity circuits 730 and 765 within the FEIT station 700 shown in FIG. 7 will be described. The channel selectivity circuitry 800 includes the forward link channel selectivity circuit 730 and the reverse link channel selectivity circuit 765. The forward link channel selectivity circuitry 730 comprises a low pass filter 805, three amplifiers 810, 820 and 830, a variable attenuator 815, a Surface Acoustic Wave (SAW) filter 825, a mixer 835, and a local oscillator (synthesized source) 840 connected to the mixer 835. The reverse link channel selectivity circuitry 765 comprises similar components to those of the forward link channel selectivity 730 except for minor variations. The channel selectivity circuitry allows channel re-usability and simpler narrow-band filtering. Furthermore, the combination of the elements within the channel selectivity circuitry gives a cleaner out of band response, i.e., there is less power in the frequencies outside the desired band, e.g., 2.5 MHz, of the SAW filter.

Figure 8:
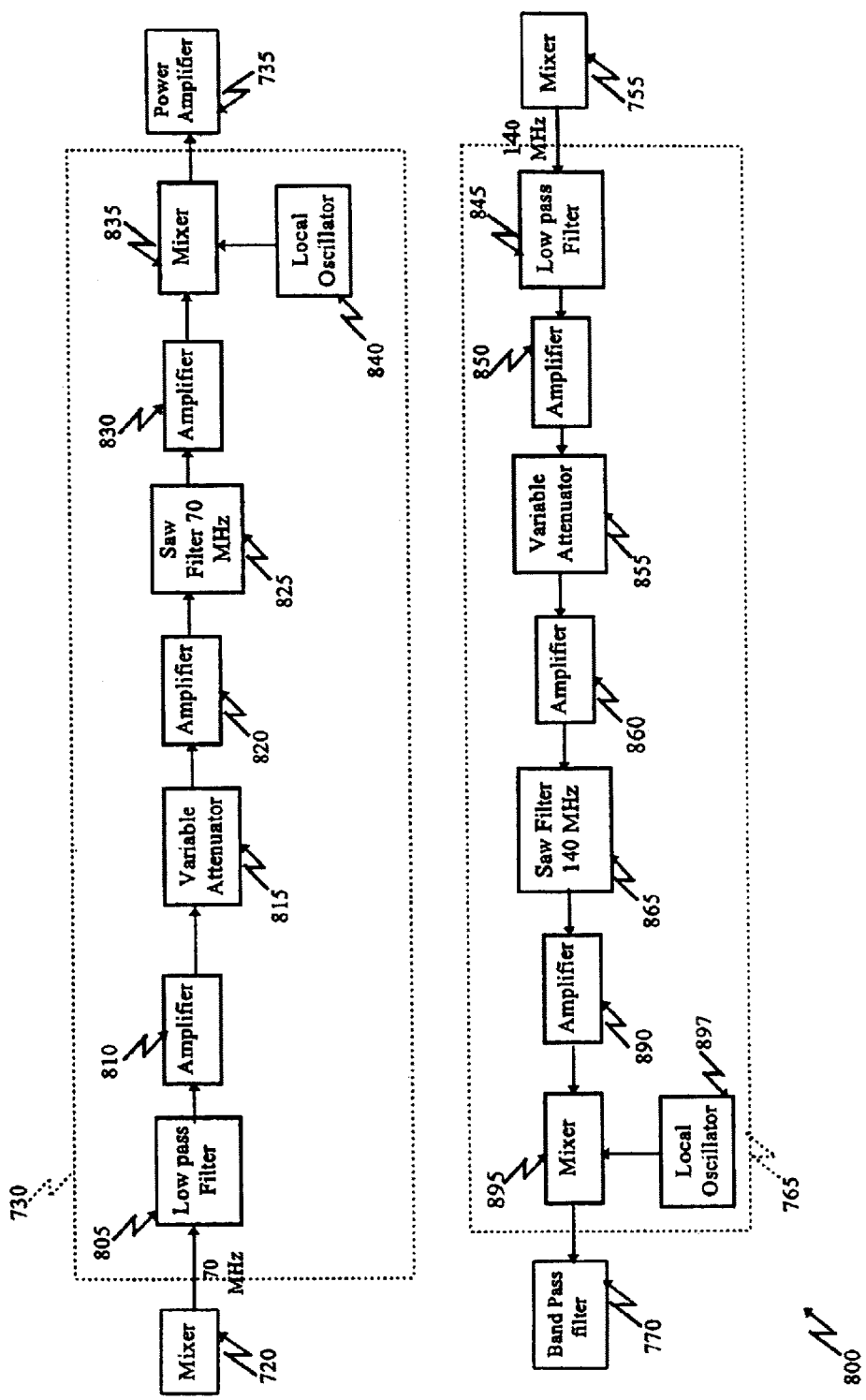
FIG. 8 is a functional block diagram of the Channel Selectivity circuit shown in FIG. 7.

As shown in FIG. 8, for the forward link, IF signals (70 MHz) are fed directly into a low pass filter 805 from the mixer 720. The low pass filter 805 filters the IF signals from the undesired frequencies generated by the combination of the mixer 720 and the local oscillator 725. The low pass filtered signals are then fed into the amplifier 810 to improve the noise figure. The resulting signals are then fed into the variable attenuator 815. The variable attenuator 815 is used for manual gain control during system set-up. The IF signals are further amplified via the amplifier 820 and then fed directly to the SAW filter 825. In one embodiment, the SAW filter 825 has a center frequency of 70 MHz and a better shape factor as well as a higher rejection than other filter types. It is necessary to mention that other types of filter could be used for this design. However, the filter used should have a shape factor and higher rejection of spurious signals and noise similar to that of the SAW filter. The SAW filtered signals are then fed to the amplifier 830 for further improvement of the noise figure. The resulting signals are then fed into the mixer 835 combined with the local oscillator 840 for up-conversion to the PCS frequencies (1930–1990 MHz) or any other range of frequencies. The PCS signals are then fed into the power amplifier 835 for transmission via the high gain directional antenna 745.

For the reverse link, except for minor variations, processing similar to that discussed above is repeated in reverse order. The IF signals (140 MHz) are fed into the low pass filter 845 from the mixer 755. The low pass filtered signals are then amplified by an amplifier 850 to improve the system noise figure, fed into the variable attenuator 855, additionally amplified 860 and then fed into the SAW filter 865. In one embodiment, the SAW filter 865 has a center frequency of 140 MHz. After further amplification of the IF signals within the amplifier 890, the signals are fed into the mixer 895 which, combined with the local oscillator (synthesized source) 897, up-converts the IF signals at 140 MHz into the ISM frequency range (or any other frequency). The channel selectivity circuitry 800 is not necessarily restricted to the above delineated equipment characteristics. Equipment having similar functionality but different characteristics may also be used.

In another embodiment, frequencies other than 140 MHz in one direction of the channel selectivity circuit and 70 MHz in the other direction can be used. In one embodiment, the values of 140 MHz and 70 MHz may be selected, as SAW filters at these frequencies are readily available. However, SAW filters for other frequencies can be used. The difference between the transmit (Tx) IF frequency and receive (Rx) IF frequency is determined by FCC rules which specify that there must be a 70 MHz difference between Tx and Rx frequencies. For example, if a Tx IF of 100 MHz is chosen, the Rx IF would be 30 MHz.

Figure 9:
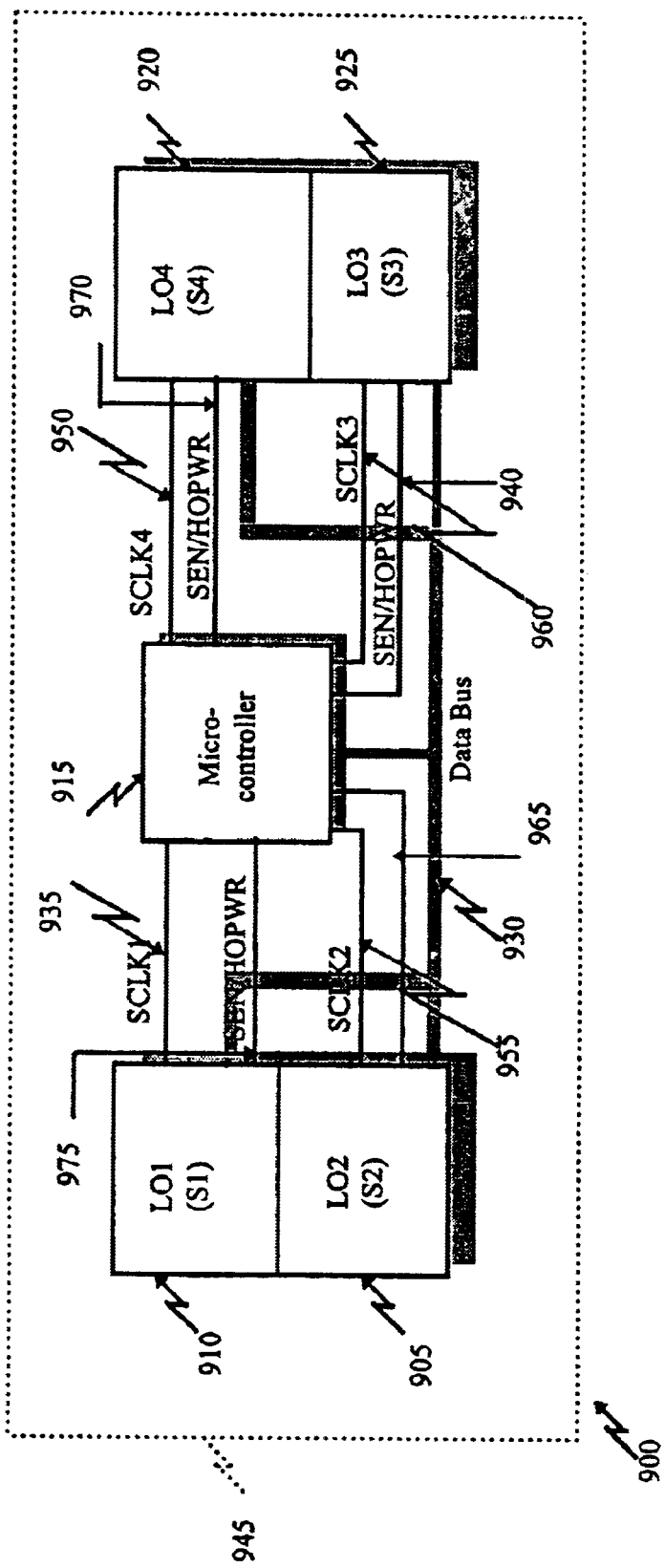
FIG. 9 is a block diagram showing the control of the synthesized sources within either the NEIT or the FEIT by a microcontroller.

Referring now to FIG. 9, the control of the synthesized sources (Local Oscillators L01, L02, L03 and L04) within either the NEIT or the FEIT by a microcontroller will be described. This module 900 is suitable for both the NEIT 200 described in FIG. 5 within the repeater system 100 shown in FIG. 1 or the FEIT 700 described in FIG. 7. This module 900 comprises a microcontroller 915 and a set of synthesized sources 905, 910, 920 and 925 connected to the microcontroller 915. A feature of this module 900 is the ability to program the synthesized sources with the proper frequency depending on what communications band is used. The microcontroller 915 used for one embodiment is a H8/3048F available from Hitachi. Its main functions are to program the right frequency to each synthesizer serially, and to control the signaling at the system level and end-to end signaling. Note that for each of the NEIT and the FEIT, four synthesizers are used. The synthesized source (905, 910, 920 and 925) used for one embodiment may be a Q3236 chip available from Qualcomm Incorporated. This chip is a low power chip and presents a solution for Phase-Locked Loop (PLL) Frequency synthesizers. These synthesizers (S1, S2, S3 and S4) require only a single +5V supply and contain all the necessary elements (with the exception of the VCO and loop filter components) to build a PLL frequency synthesizer operating from UHF through L-Band. As mentioned above and shown in FIG. 9, the microcontroller 915 programs the synthesized sources 905, 910, 920 and 925 serially via a data bus 930. In one embodiment, the data bus 930 comprises twenty counter programming bits and uses three signals, namely SDATA (sent over the data bus 930), Serial-Clock (SCLK) 935 and Shift-Enable (SEN) 940 which is combined with the Hop-Write signal (HOPWR). The interface between the microcontroller 915 and each of the synthesized sources (905, 910, 920 and 925) is double buffered including a set of primary registers and secondary registers. For each synthesized source, the data is shifted serially into the SDATA input on the rising edge of the SCLK (935, 950, 955 and 960) input, while the SEN or HOPWR (940, 965, 970 and 975) control input is "Low".

As a sample application of the above, the synthesized sources (S1, S2, S3 and S4) within both the NEIT 200 and FEIT 700 are designed to generate output frequencies from 900 to 2400 MHz in 0.625 and 1.25 MHz steps while phase locked to a 10 MHz reference oscillator input. The 1.25 MHz frequency step size requires a phase detector comparison frequency ($F_{PD}$) of 1.25 MHz.

A 'C' and assembly language program may be written to run on the microcontroller 915. One function of the program is to determine the frequency output for each of the synthesized sources S1, S2, S3 and S4. The program may be downloaded into a read-only memory (ROM), or Flash memory within the microcontroller 915. The microcontroller 915 has a separate board and is connected to the four synthesized sources within each of the NEIT 200 and FEIT 700 (one microcontroller for each unit). When the system 100 is powered on, the microcontroller 915 executes the program in its Flash memory (ROM). The microcontroller 915 is part of the system 100 (one unit within the NEIT 200 and another one within the FEIT 700). The microcontroller program starts by asking a system technician for a channel number which allows the calculation of the downlink frequency and uplink frequency. In one embodiment, each PCS vendor assigns a channel number to a particular client. A default channel number may be assigned if the technician does not make a selection. Once the downlink and uplink frequencies are determined, the programming of the twenty binary counters is carried out. The programming of the synthesized sources (S1, S2, S3 and S4) via the microcontroller 915 is not necessarily restricted to the above delineated equipment characteristics. Other equipment having similar functionality but different characteristics may also be used.

Figure 10:
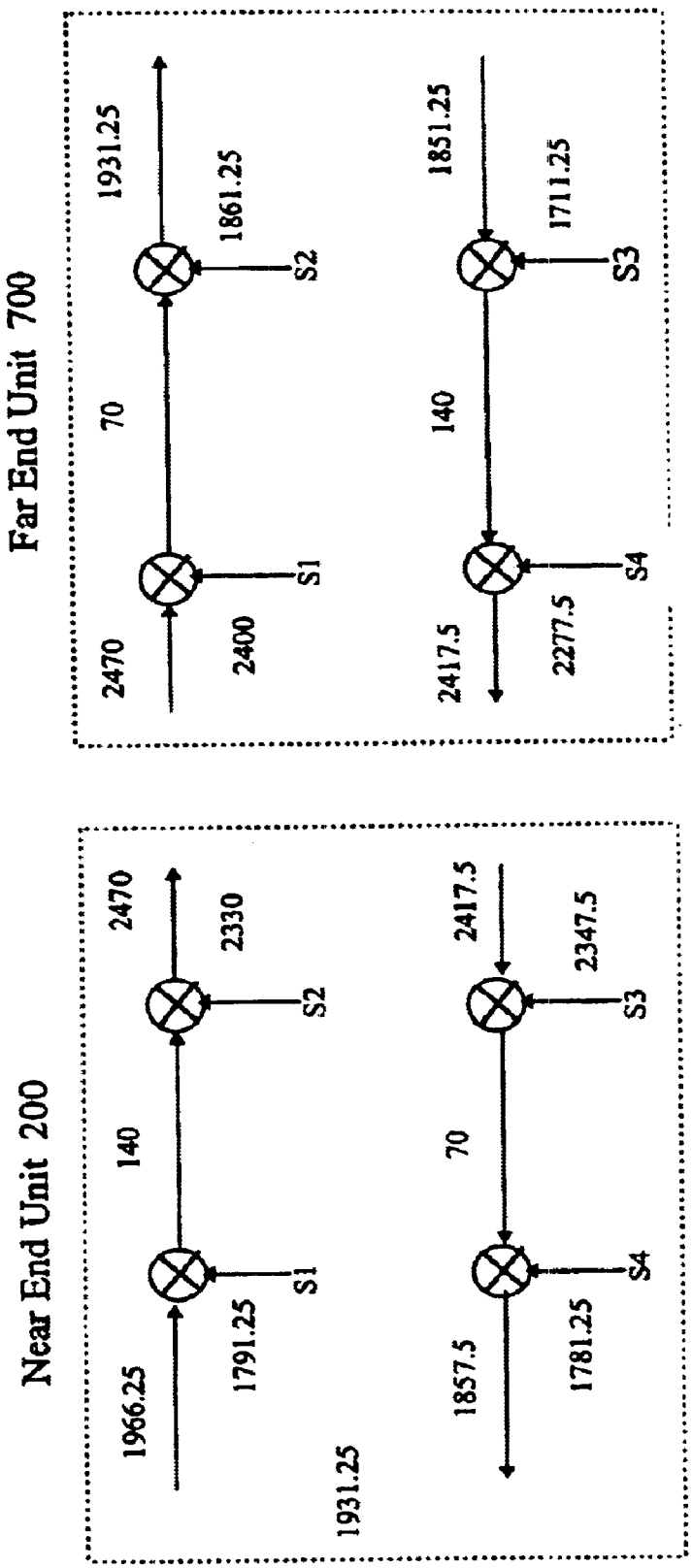
FIG. 10 is an illustrative example of the relationship between the synthesized sources and the microcontroller for both the NEIT and FEIT used in the repeater system described in FIG. 1.

Referring now to FIG. 10, an example illustrating the programmability of the synthesized sources S1, S2, S3 and S4 for both the NEIT 200 (FIG. 5) and FEIT 700 (FIG. 7) for an exemplary Sprint PCS system is shown below. All frequency units below are in MegaHertz (MHz).

The procedure is as follows:

Exemplary Channel Number=25

Downlink frequency for Sprint PCS=25*1.25+1900=1931.25

Uplink frequency for Sprint PCS=Downlink frequency−80=1851.25

NEIT

Frequency output for S1=1931.25−140=1791.25

Frequency output for S2=ISM-Frequency−140=2470−140=2330

Frequency output for S3=ISM-Frequency−70=2417.5−70=2347.5 frequency output for S4=Up-Link frequency−70=1851.25−70=1781.25

FEIT

Frequency output for S1=ISM-Frequency−70=2470−70=2400

Frequency output for S2=1931.25−70=1861.25

Frequency output for S3=1851.25−140=1711.25 frequency output for S4=ISM-Frequency−140=2417.5−140=2277.5

The following tables summarize the electrical specifications for the Near-End Transceiver and Far-End Transceiver for a PCS/ISM system:

NEIT Specifications:

1. Antenna Isolation Requirements

No spatial separation requirements are needed for the provision of antenna isolation. The isolation is provided in the frequency domain.

2. Electrical Specifications

| Parameter | PCS Band | ISM Band |
|---|---|---|
| Frequency range | 1850 to 1990 MHz | 2400 to 2483.5 MHz |
| Bandwidth | 5 MHz (E-band) | 15 MHz |
| Gain at max setting | 75 dB | 65 dB |
| Receiver Sensitivity | −70 dBm | <−90 dBm |
| Output Power | −25 dBm max | 23 dBm max |
| Spurious At max gain | | |
| Noise Figure | <6 dB (less than) | <6 dB |
| Maximum Input Level | −30 dBm | −40 dBm |
| Signal delay | <1 μs | <1 μs |
| RF Connectors | N-type (Female) | N-type (Female) |
| Impedance | 50 Ω | 50 Ω |
| Flatness over 1.25 MHz | <1.5 dB | <1.5 dB |
| Digital Attenuator | 0 to 44 dB (2 dB steps) | 0 to 44 dB (2 dB steps) |
| Synthesizer phase noise | 65 dBc/Hz | 65 dBc/Hz |
| Stability of Ref. Oscillator | ±1.5 ppm | ±1.5 ppm |
| 1 dB Compression point (PA) | 15 dBm | 28 dBm |
| IM3 | 25 dBc | 38 dBc |
| Voltage Supply | 120 AC | 120 AC |
| Power Consumption | 0.35 A @ 120 VAC | |

FEIT Specifications

1. Antenna Isolation Requirements

No spatial separation requirements are needed for the provision of antenna isolation. The isolation is provided in the frequency domain.

2. Electrical Specifications

| Parameter | PCS Band | ISM Band |
|---|---|---|
| Frequency range | 1850 to 1990 MHz | 2400 to 2483.5 MHz |
| Bandwidth | 5 MHz (E-band) | 15 MHz |
| Gain at max setting | 120 dB | 140 dB |
| Receiver Sensitivity | −95 dBm | <−90 dBm |
| Output Power | 43 dBm max | 23 dBm max |
| Spurious At max gain | | |

-continued

| Parameter | PCS Band | ISM Band |
|---|---|---|
| Noise Figure | <6 dB | <6 dB |
| Maximum Input Level | −40 dBm | −40 dBm |
| Signal delay | 1 µs | 1 µs |
| RF Connectors | N-type (Female) | N-type (Female) |
| Impedance | 50 Ω | 50 Ω |
| Flatness over 1.25 MHz | <1.5 dB | <1.5 dB |
| Digital Attenuator | 0 to 44 dB (2 dB steps) | 0 to 44 dB (2 dB steps) |
| Synthesizer phase noise | 65 dBc/Hz | 65 dBc/Hz |
| Stability of Ref. Oscillator | ±1.5 ppm | ±1.5 ppm |
| 1 dB Compression point (PA) | 44 dBm | 28 dBm |
| IM3 | 54 dBc | 38 dBc |
| Voltage Supply | 120 AC | 120 AC |
| Power Consumption | 2.1 A @ 120 VAC | |

In view of the foregoing, it will be appreciated that the present invention overcomes the long-standing need for expanding coverage areas of wireless communication base stations without the disadvantages of cascaded repeaters, or the expense of provisioning new entire base stations. The present invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A terrestrial radio frequency (RF) communication system, comprising:
    a near-end station at a fixed terrestrial location within a first cell receiving a signal having at least one first carrier frequency within a cellular frequency band from a wireless cellular communication system, the near-end station including:
        a near-end converter converting the first carrier frequency to at least one first intermediate frequency;
        a near-end channel selectivity circuit selecting one channel from the signal and converting the first intermediate frequency to at least one second carrier frequency, wherein the second carrier frequency is a non-cellular frequency, and
        a near-end transmitter wirelessly transmitting the selected channel having the second carrier frequency, and wherein the near-end station does not change the modulation or signalling scheme of the signal having at least one first carrier frequency; and
    a far-end station at a fixed terrestrial location within a second cell located apart from the first cell including:
        a far-end receiver wirelessly receiving the selected channel having the second carrier frequency from the near-end transmitter and converting the second carrier frequency to a second intermediate frequency,
        a far-end channel selectivity circuit selectively filtering the received channel and converting the second intermediate frequency to the first carrier frequency, and
        a far-end transmitter transmitting the received channel having the first carrier frequency, and wherein the far-end station does not change the modulation or signalling scheme of the selected channel having the second carrier frequency.

2. The system as defined in claim 1, wherein the near-end station receives the signal having at least one first carrier frequency from the wireless communication system via a RF cable.

3. The system as defined in claim 1, wherein the near-end station receives the signal having at least one first carrier frequency from the wireless communication system via an antenna.

4. The system as defined in claim 1, wherein the first carrier frequency is in the PCS band.

5. The system as defined in claim 1, wherein the first intermediate frequency is centered at 140 MegaHertz.

6. The system as defined in claim 1, wherein the second carrier frequency is in the Industrial, Scientific and Medical (ISM) band.

7. The system as defined in claim 1, wherein the second intermediate frequency is centered at 70 MegaHertz.

8. The system as defined in claim 1, wherein the signal having at least one first carrier frequency is a CDMA signal.

9. The system as defined in claim 1, wherein each of the near-end and far-end channel selectivity circuits include a mixer receiving the channel and connected to an oscillator and additionally comprising a microcontroller capable of programming the oscillator frequency.

10. The system as defined in claim 1, wherein each of the near-end and far-end channel selectivity circuits includes a surface acoustic wave (SAW) filter.

11. The system as defined in claim 10, wherein the SAW filter reduces out of band interference.

12. The system as defined in claim 1, additionally comprising one or more additional channel selectivity circuits in parallel to the near-end forward link channel selectivity circuit, each of said additional channel selectivity circuits selecting a different channel than the other channel selectivity circuits in a forward link path of the near-end station.

13. The system as defined in claim 1, wherein use of the near-end station and far-end station permits generation of a new cell in a cellular system, thereby expanding coverage of the wireless communication system.

14. The system as defined in claim 1, wherein the first carrier frequency and the second carrier frequency are in different frequency bands.

15. The system as defined in claim 14, wherein the first carrier frequency is in the PCS band, and the second carrier frequency is in the Industrial, Scientific and Medical (ISM) band.

16. A terrestrial radio frequency (RF) communication system, comprising:
    a far-end station at a fixed terrestrial location within a first cell receiving a signal having at least one first carrier frequency within a cellular frequency band, the far-end station including:
        a far-end converter converting the first carrier frequency to at least one first intermediate frequency, wherein the far-end converter does not change the modulation or signalling scheme of the signal having at least one first carrier frequency,
        a far-end channel selectivity circuit selecting one channel from the signal and converting the first intermediate frequency to a different second carrier frequency, wherein the second carrier frequency is a non-cellular frequency, and
        a far-end transmitter transmitting the selected channel having the different second carrier frequency; and
    a near-end station at a fixed terrestrial location within a second cell, wherein the second cell is located apart from the first cell, the near-end station including:
        a near-end receiver receiving the selected channel having the different second carrier frequency from the far-end transmitter,
        a near-end converter converting the different second carrier frequency to a second intermediate frequency, wherein the near-end converter does not change the modulation or signalling scheme of the selected channel having the different second carrier frequency, and a near-end channel selectivity circuit selectively filtering the received channel and converting the second intermediate frequency to the first carrier frequency;

wherein the first carrier frequency is in the PCS band, and the different second carrier frequency is in the ISM band.

17. A method of communicating a radio frequency (RF) signal in a terrestrial system, the method comprising:

receiving, at a first fixed terrestrial location within a first cell, a signal having at least one first carrier frequency within a cellular frequency band from a wireless cellular communication system;

converting the first carrier frequency to at least one first intermediate frequency without changing the modulation or signalling scheme of the signal having the first carrier frequency;

selecting one channel from the signal;

converting the first intermediate frequency to at least one second carrier frequency, wherein the second carrier frequency is a non-cellular frequency;

wirelessly transmitting the selected channel having the second carrier frequency;

wirelessly receiving, at a second fixed terrestrial location within a second cell located apart from the first cell, the selected channel having the second carrier frequency;

converting the second carrier frequency to a second intermediate frequency;

filtering the received channel;

converting the second intermediate frequency to the first carrier frequency; and communicating the received channel having the first carrier frequency to a distant station.

18. The method as defined in claim 17, wherein the wireless communication system is a cellular communication system.

19. The method as defined in claim 17, wherein a RF cable is used to receive the signal having at least one first carrier frequency.

20. The method as defined in claim 17, wherein an antenna is used to receive the signal having at least one first carrier frequency.

21. The method as defined in claim 17, wherein the first carrier frequency is in the PCS band, and the second carrier frequency is in the ISM band.

22. The method as defined in claim 17, wherein the signal having at least one first carrier frequency is a CDMA signal.

23. A method of converting carrier frequencies of a radio frequency (RF) signal in a terrestrial system, the method comprising:

receiving at a first fixed terrestrial location within a first cell, a signal having at least one first carrier frequency within a cellular frequency band;

converting the first carrier frequency to at least one first intermediate frequency without changing the modulation or signalling scheme of the signal having the first carrier frequency;

selecting one channel from the signal;

converting the first intermediate frequency to at least one second carrier frequency, wherein the second carrier frequency is a non-cellular frequency;

wirelessly transmitting the selected channel having the second carrier frequency;

wirelessly receiving, at a second terrestrial location within a second cell located apart from the first cell, the selected channel having the second carrier frequency;

converting the second carrier frequency to a second intermediate frequency;

filtering the received selected channel;

converting the second intermediate frequency to the first carrier frequency; and communicating the received selected channel having the first carrier frequency to a wireless cellular communication system.

24. A terrestrial radio frequency (RF) communication system, comprising:

a near-end station receiving a signal having at least one original carrier frequency in a cellular frequency band, the near-end station including:

a near-end converter converting the original carrier frequency to at least one first intermediate frequency, a near-end filtering circuit capable of narrow band filtering the signal having the first intermediate frequency and converting the first intermediate frequency to at least one different higher carrier frequency in a non-cellular frequency band, and a near-end transmitter transmitting the signal having the different higher carrier frequency, wherein the near-end station does not change the modulation or signaling scheme of the signal having at least one first carrier frequency; a far-end station including:

a far-end converter converting the different higher carrier frequency to the original carrier frequency and wherein the far-end converter does not change the modulation or signalling scheme of the signal having the original carrier frequency, and a far-end transceiver receiving the signal having the different higher carrier frequency from the near-end transmitter, and transmitting the signal having the original lower carrier frequency.

* * * * *